United States Patent [19]

Segal et al.

[11] Patent Number: 4,701,523
[45] Date of Patent: Oct. 20, 1987

[54] WATER-SOLUBLE DISAZO COMPOUNDS CONTAINING ONE OR TWO (NITRO-PHENYLAMINO)-PHENYLAMINO-CHLOROTRIAZINYLAMINO GROUPS, THE NITRO-PHENYLAMINO BEING ADDITIONALLY SUBSTITUTED BY A FIBER-REACTIVE GROUP OF THE VINYLSULFONE SERIES, SUITABLE AS DYESTUFFS

[76] Inventors: Marcos Segal; Michael Kunze, both c/o Hoechst Atkiengesellschaft, P.O. Box 80 03 20, D-6230 Frankfurt am Main 80, Fed. Rep. of Germany

[21] Appl. No.: 862,681

[22] Filed: May 13, 1986

[30] Foreign Application Priority Data

May 15, 1985 [DE] Fed. Rep. of Germany ....... 3517547

[51] Int. Cl.$^4$ .................... C09B 62/09; C09B 62/513; D06P 1/38; D06P 1/382
[52] U.S. Cl. ............................ 534/634; 534/581; 534/582; 534/598; 534/617; 534/637; 534/642; 534/887
[58] Field of Search ................ 534/617, 634, 637, 642

[56] References Cited

U.S. PATENT DOCUMENTS

| | | | |
|---|---|---|---|
| 3,223,470 | 12/1965 | Boedeker et al. | 534/637 X |
| 4,323,497 | 4/1982 | Hoyer et al. | 534/634 X |
| 4,460,505 | 7/1984 | Schundehutter et al. | 534/637 |
| 4,560,388 | 12/1985 | Rohrer | 534/634 X |
| 4,622,390 | 11/1986 | Meininger et al. | 534/634 |

FOREIGN PATENT DOCUMENTS

| | | | |
|---|---|---|---|
| 0048355 | 3/1982 | European Pat. Off. | 534/634 |
| 1179317 | 10/1964 | Fed. Rep. of Germany | 534/638 |
| 1013442 | 12/1965 | United Kingdom | 534/638 |

Primary Examiner—Floyd D. Higel

[57] ABSTRACT

Water-soluble disazo compounds which have fiber-reactive dye properties, which are suitable for dyeing carboxamido- and/or hydroxy- containing materials, in particular cellulose fiber materials, and which contain as bivalent coupling component 1-amino-8-naphthol-3,6- or -4,6-disulfonic acid and as diazo components an optionally substituted phenyl radical or naphthyl radical, one or both of the diazo components possessing a fiber-reactive group of the general formula

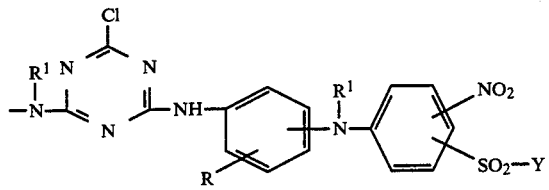

in which the two $R^1$, identical to or different from each other, denote a hydrogen atom or an optionally substituted alkyl group of 1 to 4 carbon atoms, R is a hydrogen atom of a sulfo group and Y represents the vinyl group or a $\beta$-thiosulfatoethyl, $\beta$-phosphatoethyl, $\beta$-chloroethyl or $\beta$-sulfatoethyl group, and it being possible for one of these diazo components also to contain, as substituent in place of this fiber-reactive grouping, a fiber-reactive group of the formula —$SO_2$—Y where Y has the abovementioned meaning.

2 Claims, No Drawings

WATER-SOLUBLE DISAZO COMPOUNDS CONTAINING ONE OR TWO (NITRO-PHENYLAMINO)-PHENYLAMINO-CHLOROTRIAZINYLAMINO GROUPS, THE NITRO-PHENYLAMINO BEING ADDITIONALLY SUBSTITUTED BY A FIBER-REACTIVE GROUP OF THE VINYLSULFONE SERIES, SUITABLE AS DYESTUFFS

The invention is in the technical field of fiber-reactive dyes.

The present invention provides new valuable water-soluble disazo compounds which conform to the general formula (1)

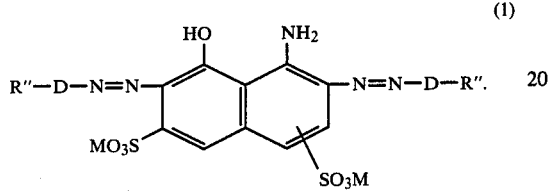

(1)

wherein:

M is the equivalent of an alkaline earth metal, such as of calcium, but preferably is a hydrogen atom or in particular an alkali metal, such as sodium, potassium or lithium;

R″ is a hydrogen atom or a radical of the general formula (2)

(2)

in which

Y is the vinyl group or a β-thiosulfatoethyl, β-phosphatoethyl, β-chloroethyl or preferably β-sulfatoethyl group, or R″ is a group Z of the general formula (3) shown and defined below, it being possible for the two R″ to be identical to or different from each other, but at least one of the two R″ mandatorily being a group of the general formula (3);

Z is a group of the general formula (3)

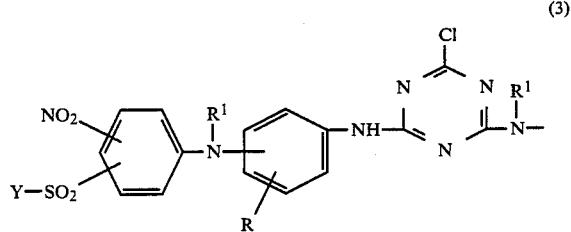

(3)

in which the nitro group and the —SO₂—Y group are preferably bonded to the benzene nucleus in the meta-position relative to each other and are not simultaneously in the ortho-position relative to the amino group —NR¹—, R¹ stands for a hydrogen atom or an optionally substituted alkyl group of 1 to 4 carbon atoms, it being possible for the two R¹ to be identical to or different from each other, R denotes a hydrogen atom or a sulfo group and Y is the vinyl group or a β-thiosulfatoethyl, β-phosphatoethyl, β-chloroethyl or preferably a β-sulfatoethyl group, it being possible for the groups Y in formulae (2) and (3) to be identical to or different from each other;

D denotes together with R″ equal to a hydrogen atom a phenyl group unsubstituted or substituted by substituents, preferably 1 or 2 substituents, which below to the group of substituents consisting of alkyl of 1 to 4 carbon atoms, such as methyl and ethyl, alkoxy of 1 to 4 carbon atoms, such as methoxy and ethoxy, carboxy, alkanoylamino of 2 to 5 carbon atoms which can be substituted, of which preferably acetylamino, optionally substituted benzoylamino of which in particular benzoylamino and sulfobenzoylamino, phenylamino, sulfophenylamino, carbamoyl, carbamoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenylsulfamoyl, N-phenyl-N-(C₁-C₄-alkyl)sulfamoyl, cyano, nitro, chlorine, bromine, fluorine, trifluoromethyl, hydroxy and sulfo, or D denotes together with R″=H a naphthyl group unsubstituted or substituted by substituents, such as 1, 2 or 3 substituents, which belong to the group of substituents consisting of sulfo, carboxy, methyl, ethyl, methoxy, ethoxy, chlorine and nitro, or D is in the case where R″ stands for a group of the general formula (2) a phenylene group unsubstituted or substituted by 1 or 2 substituents which belong to the group consisting of alkyl of 1 to 4 carbon atoms, such as methyl and ethyl, alkoxy of 1 to 4 carbon atoms, such as methoxy and ethoxy, carboxyl, chlorine, bromine, fluorine, trifluoromethyl and sulfo, or is a naphthylene group which can be substituted by 1 or 2 sulfo groups, or D is in the case where R″ denotes a group of the general formula (3) a phenylene group unsubstituted or substituted by 1 or 2 substituents which belong to the group of substituents consisting of alkyl of 1 to 4 carbon atoms, such as methyl and ethyl, alkoxy of 1 to 4 carbon atoms, such as methoxy and ethoxy, chlorine and sulfo.

Insofar as R″ is a group of the general formula (2), D is preferably a phenylene group unsubstituted or substituted by 1 or 2 substituents which are selected from the group consisting of 2 alkyl of 1 to 4 carbon atoms, 2 alkoxy of 1 to 4 carbon atoms, 2 chlorine, 1 bromine, 1 sulfo and 1 carboxyl, or is a naphthylene group which is substituted by no further substituents or by 1 or 2 sulfo groups.

Insofar as R″ is a group Z of the general formula (3), D is a phenylene group which is preferably not substituted by further substituents or is substituted by 1 alkyl group of 1 to 4 carbon atoms, 1 alkoxy group of 1 to 4 carbon atoms or by 1 or 2 sulfo groups, preferably by 1 sulfo group.

Particularly preferably, however, in the case where R″ denotes a radical Z, the formula radical R″—D— (or -D—R″) is a radical of the formula (4a), (4b), (4c), (4d) or (4e)

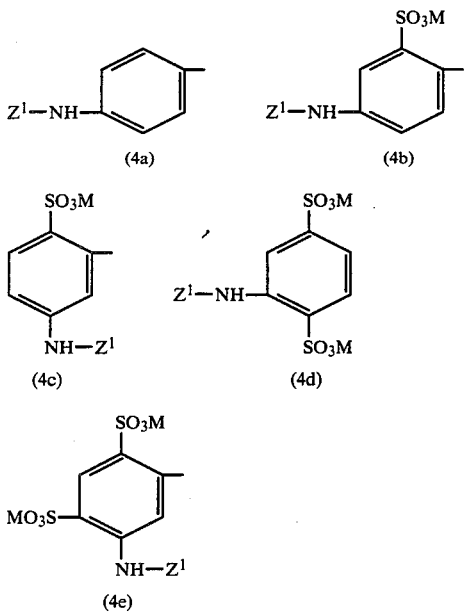

in which M has the abovementioned meaning and $Z^1$ represents a fiber-reactive radical of the general formula (3a)

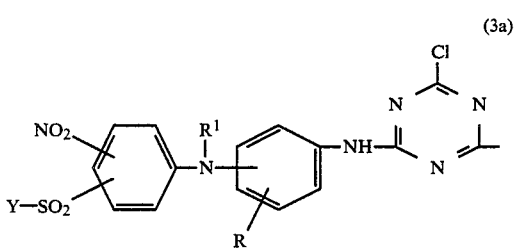

in which R, $R^1$ and Y have the abovementioned meanings.

Insofar as R" is a radical of the general formula (2) or (3), the radical (2) or (3) is preferably in the meta- or para-position relative to the azo group.

Alkyl groups of 1 to 4 carbon atoms which are substituted are for example those which are substituted by one or two, preferably one, substituent from the group consisting of acetylamino, hydroxy, sulfato, alkoxy of 1 to 4 carbon atoms, sulfo and carboxy.

Preferably the formula radicals $R^1$ are a hydrogen atom or an alkyl group of 1 to 4 carbon atoms, such as in particular the methyl or ethyl group.

A sulfo group is a group conforming to the general formula —$SO_3M$, a carboxy group a group conforming to the general formula —COOM, a thiosulfato group a group conforming to the general formula —S—$SO_3M$, a phosphato group a group conforming to the general formula —$OPO_3M_2$ and a sulfato group a group conforming to the general formula —$OSO_3M$, where M has the abovementioned, particularly preferred, meaning.

The azo compounds according to the invention can be present in the form of their free acids and preferably in the form of their salts, in particular neutral salts; salts to be mentioned in particular are the alkali metal salts. The new compounds are preferably in the form of these salts when finding utility for dyeing and printing hydroxy- and/or carboxamido-containing fiber material.

The present invention further relates to a process for preparing the disazo compounds of the general formula (1).

This process comprises coupling a diazonium compound of an amine of the general formula (5)

in which D and R" have the abovementioned meanings, with 1-amino-3,6-disulfo-8-hydroxynaphthalene or 1-amino-4,6-disulfo-8-hydroxynaphthalene in equimolar or practically equimolar amounts at a pH value between 0 and 3.5 and then coupling the monoazo compound as formed with a further diazonium compound of an amine of the general formula (5) mentioned and defined above in an equimolar or practically equimolar amount at a pH value between 4.5 and 7.5, preferably between 5 and 7, and at least one of the two diazonium salts used of the amines (5) mandatorily contains, in accordance with the definition of the disazo compounds of the general formula (1), a group of the general formula (3).

Insofar as the two R" are identical to one another, i.e. represent a radical Z, the diazonium salt of this amine (5) can also be added to the coupling component in twice the equimolar amount and the coupling reaction be carried out in two successive steps: the first coupling taking place in a strongly acid range and the second coupling after addition of a customary, for this purpose, acid-binding compound within the weakly acid to neutral range.

The preparation according to the invention of the disazo compounds of the general formula (1) is effected in an aqueous organic, preferably in an aqueous medium. Insofar as an organic solvent is present, it is a water-miscible solvent, such as, for example, acetone, dioxane, dimethylformamide, N-methylpiperidine and caprolactam.

The two coupling reactions are generally carried out at a reaction temperature between +5° C. and +25° C.

The starting compounds of the general formula (5) in which R" stands for a radical Z of the general formula (3), i.e. aniline compounds of the general formula (5a)

can be prepared in a perfectly conventional manner from corresponding phenylenediamine compounds conforming to the general formula (5b)

in which D denotes a phenylene radical which can be substituted by 1 or 2 substituents from the group consisting of alkyl of 1 to 4 carbon atoms, alkoxy of 1 to 4 carbon atoms, chlorine and sulfo, and $R^1$ has the abovementioned meaning, by reaction with cyanuric chloride and a nitroaminodiphenylamine compound of the general formula (6)

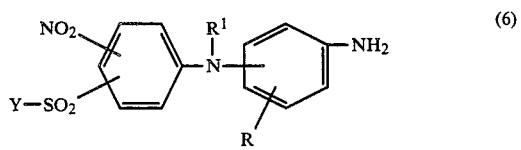

in which R, $R^1$ and Y have the abovementioned meanings. Thus, for example, the synthesis of the compounds of the general formula (5a) is effected by reacting a compound of the general formula (5b) with a dichlorotriazinylaminonitrodiphenylamine compound of the general formula (7)

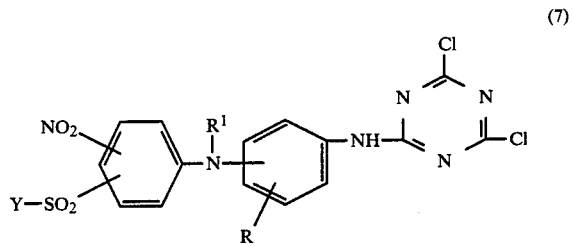

(7)

in which R, $R^1$ and Y have the abovementioned meanings, in an aqueous organic or preferably aqueous medium at a temperature between 10° and 20° C. and at a pH value between 6 and 6.5.

The starting compound of the general formula (7) can likewise be prepared analogously to known procedures by reacting cyanuric chloride with a nitrodiphenylamine compound of the general formula (6) mentioned and defined above, thus for example in an aqueous organic medium or aqueous medium at a temperature between 5° and 15° C. and at a pH value between 3.5 and 4.5.

Insofar as the abovementioned condensation reactions between the amino compounds and cyanuric chloride or between a dichlorotriazinylamino compound and an amino compound are carried out in aqueous organic medium, the organic solvent in question is preferably acetone, dioxane and dimethylformamide.

One of the aminodiphenylamine compounds of the general formula (6) serving as starting compounds is known in the form of its β-hydroxyethylsulfonyl precursor (see German Auslegeschrift No. 1,179,317, example 5). Other aminodiphenylamine compounds of the formula (6) can easily be prepared analogously via the β-hydroxyethylsulfonyl precursor by means of the corresponding isomeric acylaminoaniline and (β-hydroxyethylsulfonyl)-nitrochlorobenzene compounds. Thus for example, 1-nitro-4-(4'-aminophenylamino)-5-(β-sulfatoethylsulfonyl)-benzene is obtained by reaction of 1,4-phenylenediamine and 2-chloro-5-nitrophenyl-(β-hydroxyethyl)-sulfone in methanolic solution at a temperature between 50° and 70° C. in the course of a few hours, and after cooling down to room temperature and addition of ice-water separates out from the reaction solution in crystals in high yield.

From these β-hydroxyethylsulfonyl-substituted aminodiphenylamine starting compounds the fiber-reactive starting compounds of the general formula (6) can be synthesized in the manner customary for the synthesis of fiber-reactive groups of the vinylsulfonyl series. Preferably they are first converted into their sulfato derivatives by reaction with a sulfating agent analogously to known methods. Sulfating agents are for example sulfuric acid or chlorosulfonic acid in an organic solvent, such as pyridine or N-methylpyrrolidone. Analogous sulfating reactions of this kind are known for example from the previously cited German Auslegeschrift No. 1,179,317 and from British Patent Specification No. 1,540,566 and European Patent Application Publication No. 0,036,383. Preferably the sulfation of the β-hydroxyethylsulfonyl starting compound to the corresponding compound of the general formula (6) in which Y stands for the β-sulfatoethyl group is effected in 100% strength sulfuric acid at temperatures between 10° and 30° C. From this the sulfuric acid-soluble sulfato compound can be isolated after addition of the sulfuric acid solution to ice-water.

The same method can be used to prepare the compounds of the general formula (6) in which Y stands for the β-phosphatoethyl group by reaction with a suitable and, for this purpose, customary phosphating agent, such as phosphoric acid or polyphosphoric acid.

The β-sulfatoethylsulfonyl compounds of the general formula (6) can be used to prepare the corresponding vinylsulfonyl compounds (where Y is equal to the vinyl group in formula (6)) by reaction with an alkali in aqueous solution, for example by treating a solution of the sulfato compound in alkaline aqueous solution at a pH value between 8 and 10 and at a temperature between about 40° and 60° C. for a short time.

These vinylsulfonyl compounds of the general formula (6) can be used to prepare the corresponding β-thiosulfatoethylsulfonyl compounds by reaction with an alkali metal thiosulfate, for example by reacting the vinylsulfonyl compound of the formula (6) with sodium thiosulfate, advantageously in excess, such as an excess of 21–40%, in aqueous weakly acid solution at a temperature between 30° and 80° C.

Aminodiphenylamine starting compounds of the general formula (6) are for example 1-nitro-2-(4'-aminophenylamino)-5-(β-sulfatoethylsulfonyl)-benzene, 1-nitro-4-(4'-aminophenylamino)-5-(β-sulfatoethylsulfonyl)-benzene, 1-nitro-2-(3'-aminophenylamino)-5-(β-sulfatoethylsulfonyl)-benzene, 1-nitro-2-(4'-amino-3'-sulfophenylamino)-5-(β-sulfatoethylsulfonyl)-benzene and 1-nitro-2-(4'-amino-2'-sulfophenylamino)-5-(β-sulfatoethylsulfonyl)-benzene.

Aromatic amines of the general formula (5b), which can serve as starting compounds for preparing the diazo components (5a) for synthesizing the compounds according to the invention, are for example, 1,4-diaminobenzene, 1,3-diaminobenzene, 1,4-diaminobenzene-2-sulfonic acid, 1,3-diaminobenzene-4-sulfonic acid, 1,4-diaminobenzene-2,5-disulfonic acid, 1,3-diaminobenzene-4,6-disulfonic acid, 1,4-diaminobenzene-2,6-disulfonic acid, 1,4-diamino-3-methylbenzene, 1,3-diamino-4-methoxybenzene.

Aromatic amines of the general formula H—D—NH$_2$ or Y—SO$_2$—D—NH$_2$ which can serve as diazo components for synthesizing the compounds according to the invention are for example 1-aminobenzene-2-sulfonic acid, 1-aminobenzene-3- and -4-sulfonic acid, 2-amino-4-sulfobenzoic acid, 2-amino-5-sulfobenzoic acid, 4-amino-2-sulfobenzoic acid, 4-aminotoluene-2- and -3-sulfonic acid, 2-aminotoluene-4- and -5-sulfonic acid, 2-aminotoluene-4-carboxylic acid, anthranilic acid, 4-aminobenzoic acid, 2-aminoanisole-4- and -5-sulfonic acid, 4-amino-anisole-2- and -3-sulfonic acid, 3-chloro-2-amino-3-toluene-5-sulfonic acid, 4-chloro-2-aminotoluene-5-sulfonic acid, 5-chloro-2-aminotoluene-3- and -4-sulfonic acid, 6-chloro-2-aminotoluene-4-sulfonic acid, 6-chloro-3-aminotoluene-4-sulfonic acid, 1-aminobenzene-2,5-disulfonic acid, 1-aminobenzene-2,4- and -3,5-disulfonic acid, 2-aminotoluene-3,5-disulfonic acid, 2-aminotoluene-4,5- and -4,6-disulfonic acid, 4-aminotoluene-2,5-disulfonic acid, 2-aminonaphthalene-1-sulfonic acid, 2-aminonaphthalene-5- and -6-sulfonic acid, 2-aminonaphthalene-7- and -8-sulfonic acid, 1-aminonaphthalene-2-, -3-, -4-, -5-, -6-, -7- and -8-sulfonic acid, 2-aminonaphthalene-4,8-disulfonic acid, 2- aminonaphthalene-6,8-disulfonic acid, 2-aminonaphthalene-1,5- and -1,7-disulfonic acid, 2-aminonaphthalene-5,7-, -3,6-, -3,7- and -4,7-disulfonic acid, 1-aminonaphthalene-2,4-, -2,5-, -3,6-, -3,7-, -3,8-, -4,6-, -4,7-, -4,8-, -5,7- and -6,8-disulfonic acid, 2-aminonaphthalene-3,6,8-trisulfonic acid, 2-aminonaphthalene-4,6,8- and -1,5,7-trisulfonic acid, 1-aminonaphthalene-2,4,7-trisulfonic acid, 1-aminonaphthalene-2,4,8-, -3,5,7-, -3,6,8- and -4,6,8-trisulfonic acid, in particular 1-amino-4-(β-sulfatoethylsulfonyl)-benzene, 1-amino-3-(β-sulfatoethylsulfonyl)-benzene, 1-amino-2-methoxy-5-(β-sulfatoethylsulfonyl)-benzene, 1-amino-2-hydroxy-5-(β-sulfatoethylsulfonyl)-benzene, 1-amino-2-hydroxy-4-(β-sulfatoethylsulfonyl)-benzene, 1-amino-2-methyl-4-(β-sulfatoethylsulfonyl)-benzene, 1-amino-2-methoxy-5-methyl-4-(β-sulfatoethylsulfonyl)-benzene, 1-amino-2,5-dimethoxy-4-(β-sulfatoethylsulfonyl)-benzene, 1-amino-2-methyl-5-methoxy-4-(β-sulfatoethylsulfonyl)-benzene, 2-chloro-1-amino-5-(β-sulfatoethylsulfonyl)-benzene, 2-sulfo-1-amino-5-(β-sulfatoethylsulfonyl)-benzene, 2-carboxy-1-amino-5-(β-sulfatoethylsulfonyl)-benzene, 1-amino-4-chloro-5-(β-sulfatoethylsulfonyl)-benzene, 1-amino-2-bromo-4-(β-sulfatoethylsulfonyl)-benzene, 1-amino-2-(β-sulfatoethylsulfonyl)-benzene, 1-amino-4-3'-(β-sulfatoethylsulfonyl)-benzoylaminobenzene, 2-amino-1-sulfo-6-(β-sulfatoethylsulfonyl)-naphthalene, 2-amino-6-sulfo-8-(β-sulfatoethylsulfonyl)-naphthalene, 1-amino-6-sulfo-4-(β-sulfatoethylsulfonyl)-naphthalene, 1-amino-7-sulfo-5-(β-sulfatoethylsulfonyl)-naphthalene, 1-amino-4-sulfo-6-(β-sulfatoethylsulfonyl)-naphthalene, 1-amino-4-sulfo-7-(β-sulfatoethylsulfonyl)-naphthalene, 2-amino-1-sulfo-5-(β-sulfatoethylsulfonyl)-naphthalene, 2-amino-1,7-disulfo-5-(β-sulfatoethylsulfonyl)-naphthalene, 2-amino-8-sulfo-6-(β-sulfatoethylsulfonyl)-naphthalene, 1-amino-4-(β-sulfatoethylsulfonyl)-naphthalene, 1-amino-5-(β-sulfatoethylsulfonyl)-naphthalene, 1-amino-6-(β-sulfatoethylsulfonyl)-naphthalene, 1-amino-7-(β-sulfatoethylsulfonyl)-naphthalene, 2-amino-5-(β-sulfatoethylsulfonyl)-naphthalene, 2-amino-6-(β-sulfatoethylsulfonyl)-naphthalene, 2-amino-7-(β-sulfatoethylsulfonyl)-naphthalene and 2-amino-8-(β-sulfatoethylsulfonyl)-naphthalene and their corresponding β-thiosulfatoethylsulfonyl, β-phosphatoethylsulfonyl, β-chloroethylsulfonyl and vinylsulfonyl derivatives.

Preferred disazo compounds of the general formula (1) are further those which conform to one of the general formulae (8) to (12)

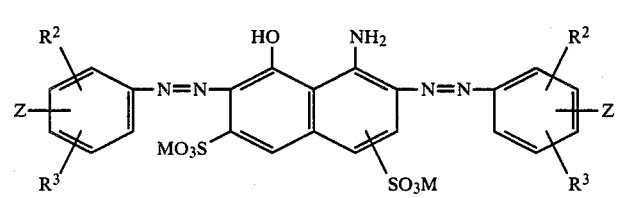

(8)

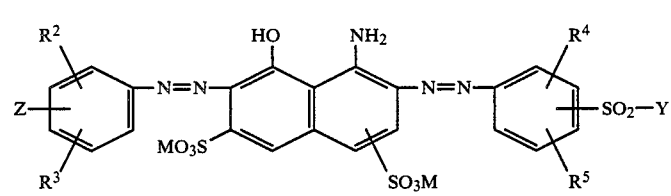

(9)

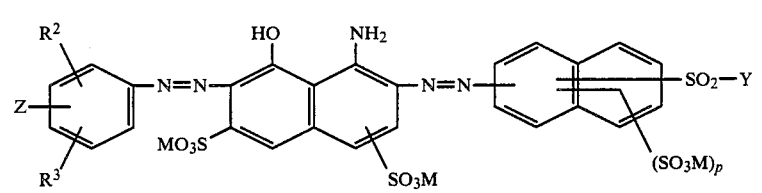

(10)

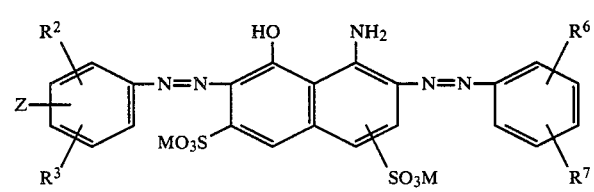

(11)

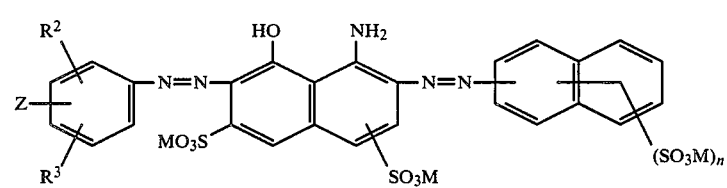

(12)

in which

M, Y and Z have the abovementioned meanings, $R^2$ is a hydrogen atom or a sulfo group, $R^3$ is an alkyl group of 1 to 4 carbon atoms, such as the ethyl group and in particular the methyl group, or a chlorine atom, but preferably is a sulfo group or a hydrogen atom, $R^4$ is a hydrogen atom, a sulfo group, a carboxy group, a chlorine atom, a bromine atom, an alkyl group of 1 to 4 carbon atoms, such as the ethyl group, and in particular the methyl group, or an alkoxy group of 1 to 4 carbon atoms, such as the ethoxy group and in particular methoxy group, $R^5$ is a hydrogen atom, a sulfo group, an alkyl group of 1 to 4 carbon atoms, such as the ethyl group and in particular the methyl group, or an alkoxy group, such as the ethoxy group and in particular the methoxy group, $R^6$ is a hydrogen atom, a sulfo group, an alkyl group of 1 to 4 carbon atoms, such as the ethyl group and in particular the methyl group, an alkoxy group of 1 to 4 carbon atoms, such as the ethoxy group and in particular the methoxy group, a carboxy group, an alkanoylamino group of 2 to 5 carbon atoms, such as the acetylamino group, the benzoylamino group, a sulfobenzoylamino group, the phenylamino group, a sulfophenylamino group, the carbamoyl group, a carbamoyl group which is monosubstituted or disubstituted by alkyl of 1 to 4 carbon atoms, the sulfamoyl group, a sulfamoyl group which is monosubstituted or disubstituted by alkyl of 1 to 4 carbon atoms, the N-phenylsulfamoyl group, a N-phenyl-N-($C_1$-$C_4$-alkyl)-sulfamoyl group, the cyano, nitro or trifluoromethyl group or a chlorine, bromine or fluorine atom, but in particular is a hydrogen atom, a sulfo group, an alkyl group of 1 to 4 carbon atoms, an alkoxy group of 1 to 4 carbon atoms, a bromine atom, a chlorine atom, a nitro group or a carboxy group, $R^7$ is a hydrogen atom, a sulfo group, an alkyl group of 1 to 4 carbon atoms, such as the ethyl group, and in particular the methyl group, or an alkoxy group of 1 to 4 carbon atoms, such as the ethoxy group and in particular the methoxy group, but particular is preferably a sulfo group, p stands for the number zero, 1 or 2 and n is the number 1, 2 or 3.

Of the compounds of the general formula (8), preference is given to those in which each $R^2$ denotes a sulfo group which is bonded in the ortho-position relative to the azo group and $R^3$ has the meaning mentioned but is preferably a hydrogen atom or a sulfo group.

Of the compounds of the general formula (9), preference is given to those in which $R^2$ is a sulfo group in the ortho-position relative to the azo group, $R^3$ is a hydrogen atom and Z is with the abovementioned meaning in the para-position relative to the sulfo group ($R^2$), $R^4$ and $R^5$ are each a hydrogen atom and the —$SO_2$—Y group is bonded to the benzene nucleus in the para-position relative to the azo group.

Of the compounds of the general formula (10) preference is given in particular to compounds which conform to the general formula (13)

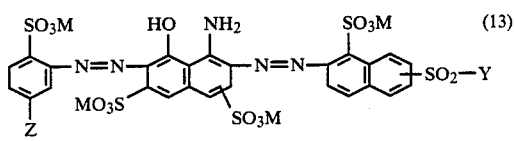

in which M, Z and Y have the abovementioned meanings. Of the compounds of the general formula (11), particular preference is given to those in which $R^2$ is a sulfo group in the ortho-position relative to the azo group, $R^3$ stands for a hydrogen atom and Z is with the abovementioned meaning bonded to the benzene nucleus in the para-position relative to the sulfo group ($R^2$), $R^6$ denotes a hydrogen atom and $R^7$ is a sulfo group in the para-position relative to the azo group.

Of the compounds of the general formula (12) particular preference is given to those which conform to the general formula (14)

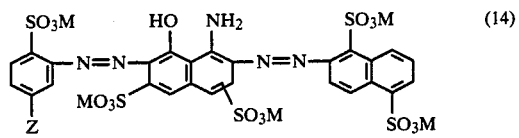

in which M and Z have the abovementioned meanings.

In these compounds of the general formulae (8) to (14), the formula radical Y is preferably the $\beta$-sulfatoethyl group; in these compounds, furthermore, the phenyl radical which is substituted by $R^2$, $R^3$ and Z is in particular a radical which conforms to one of the abovementioned formulae (4a) to (4e).

The precipitation and isolation of the compounds of the general formula (1) prepared according to the invention from the synthesis solutions can be effected by commonly known methods, thus for example either by precipitating from the reaction medium by means of electrolytes, such as, for example, sodium chloride or potassium chloride, or by evaporating the reaction solution, for example by spray-drying, it being possible to add a buffer substance to this reaction solution.

The compounds according to the invention of the general formula (1) have fiber-reactive properties and possess very good dyestuff properties. They can therefore be used for dyeing (including printing) hydroxy-containing and/or carboxamido-containing materials. It is also possible to use the solutions obtained in the synthesis of the compounds according to the invention, directly in dyeing as a liquid preparation, where appropriate after addition of a buffer substance and where appropriate also after concentration.

The present invention therefore also relates to the use of the compounds according to the invention of the general formula (1) for dyeing (including printing) hydroxy- and/or carboxamido-containing materials or, more specifically, processes for their application to these substrates. This includes mass coloration, such as, for example, of polyamide films. The materials are preferably treated in the form of fiber materials, in particular in the form of textile fibers, such as yarns, wound packages and fabrics. Herein it is possible to proceed analogously to known ways of processing.

Hydroxy-containing materials are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose rayon and filament viscose rayon.

Carboxamido-containing materials are for example synthetic and natural polyamides and polyurethanes, in particular in the form of fibers, for example wool and other animal hairs, silk, leather, nylon-6.6, nylon-6, nylon-11 and nylon-4.

The compounds according to the invention of the formula (1) can be applied and fixed in accordance with the use according to the invention on the substrates mentioned, in particular on the fiber materials mentioned, using the application techniques known for water-soluble dyes, in particular fiber-reactive dyes, for example by putting the disazo compound of the general formula (1) in dissolved form onto or into the substrate and fixing it thereon or therein, where appropriate through the agency of heat and/or where appropriate through the agency of an alkaline agent. Such ways of dyeing and fixing are numerously described in the literature.

Thus they produce on cellulose fibers by the exhaust methods from long liquor using a very wide variety of acid-binding agents and where appropriate neutral salts, such as sodium chloride or sodium sulfate, very good color yields and an excellent color buildup. Dyeing is preferably carried out in an aqueous bath at temperatures between 40° and 105° C., where appropriate at temperatures up to 130° C. under pressure, and where appropriate in the presence of customary dyeing auxiliaries. A possible procedure is to introduce the material into the warm bath and gradually to heat the latter to the desired dyeing temperature and to complete the dyeing process at that temperature. The neutral salts which speed up the exhaustion of the dye can if desired also be added to the bath not until the actual dyeing temperature is reached.

The padding processes likewise produce on cellulose fibers good color yields and a good color buildup, customary fixing options being dwelling at room temperature or elevated temperature, for example up to about 60° C., steaming or dry heat.

The customary printing methods for cellulose fibers, which can be carried out in one step, for example by printing with a print paste containing the compound according to the invention and sodium bicarbonate or some other acid-binding agent and subsequent steaming at 100° to 103° C., or in two steps, for example by printing with a neutral or weakly acid print paste which contains the compound according to the invention and subsequent fixing of the compound according to the invention either by passing the printed material through a hot alkali- and electrolyte-containing bath or by overpadding with an alkaline electrolyte-containing padding liquor and subsequent dwelling of this overpadded material or steaming or treatment with dry heat, likewise produce strong prints having well defined outlines and a clear white ground. The outcome of the prints depends only little on varying fixing conditions. Both in dyeing and printing the degrees of fixation obtained with the compounds according to the invention are very high.

Fixing by means of dry heat in the customary thermofixing processes employs hot air at 120° to 200° C. When fixing by means of steam it is possible to use in addition to customary steam at 101° to 103° C. also superheated steam and high-pressure steam at temperatures up to 160° C.

The acid-binding agents which effect fixation of the compound of the formula (1) to the cellulose fibers are for example water-soluble basic salts of alkali metals and alkaline earth metals of organic or inorganic acids or compounds which liberate alkali when hot. There may be mentioned in particular the alkali metal hydroxides and alkali metal salts of weak to medium-strength organic or inorganic acids, preferably their sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate and trisodium phosphate.

By treating the compounds according to the invention (dyes) with the acid-binding agents, where appropriate under the agency of heat, the former are bonded chemically to the cellulose fiber; in particular the cellulose dyeings display, after the customary aftertreatment by rinsing to remove unfixed dye portions, excellent wet fastness properties, in particular since unfixed dye portions are readily washed off on account of their high solubility in cold water.

The dyeings and prints prepared with the compounds according to the invention (dyes) on cellulose materials possess a high tinctorial strength, good light fastness properties and good to very good wet fastness properties, such as, for example, good to very good wash fastness properties at 60° to 95° C., even in the presence of perborates, acid and alkaline fulling, cross-dyeing and perspiration fastness properties, good to very good acid and alkaline perspiration fastness properties, a high steam resistance, good to very good alkali, acid, water and seawater fastness properties, and also a good pleating fastness, hot press fastness and rub fastness. They also have a very good resistance to acid fading on storing moist dyed material still containing acetic acid (compare German Auslegeschrift No. 2,322,236).

Particularly noteworthy are the good wet light fastness properties of cellulose fiber material dyeings and prints moistened with distilled water or tap water and their alkaline perspiration light fastness. In this respect the dyes according to the invention are surprisingly superior to the known and structurally most comparable fiber-reactive dyes mentioned at the beginning, which contain as a reactive group likewise a monochlorotriazinyl radical and a fiber-reactive group of the vinylsulfonyl series.

The dyeings on polyurethane fibers or natural or synthetic polyamide fibers are customarily carried out from an acid medium. It is thus possible for example to add to the dyebath acetic acid and/or ammonium sulfate, sodium acetate and/or ammonium acetate, in order to obtain the desired pH value. To obtain an acceptable levelness of the dyeing, it is advisable to add customary leveling auxiliaries, based, for example, on a reaction product of cyanuric chloride with three times the molar amount of an aminobenzenesulfonic acid and/or of an aminonaphthalenesulfonic acid or based on a reaction product of for example stearylamine with ethylene oxide. As a rule, the material to be dyed is entered into the bath at a temperature of about 40° C., is agitated therein for some time, the dyebath is then adjusted to the desired weakly acid, preferably weakly acetic acid, pH value, and the actual dyeing is carried out at a temperature between 60° and 98° C. But the dyeings can also be carried out at the boil or at temperatures up to 120° C. (under pressure).

The process of dyeing wool is herein effected in conventional and known manner by subjecting the fiber-reactive compound of the general formula (1) to the exhaustion process while controling of the pH value, preferably first from an acid dyebath having a pH of about 3.5 to 5.5, and toward the end of the dyeing time shifting the pH value into the neutral and where appropriate weakly alkaline range up to a pH value of 8.5, in order to bring about the full reactive bond between this dye of the formula (1) and the fiber, in particular when high depths of shade are desired. At the same time the portion of the dye which is not reactively bonded is dissolved off.

The method of processing described here is also applicable to preparing dyeings on fiber materials made of other natural polyamides or of synthetic polyamides and polyurethanes. The dyeings are carried out at temperatures of 60° to 100° C., but they can also be effected in sealed dyeing apparatuses at temperatures up to 106° C. Since the compounds of the general formula (1) are very readily water-soluble, they can advantageously also be used in conventional continuous dyeing processes. The tinctorial strength of the compounds according to the invention of the general formula (1) is very high. They produce on the fiber materials, in particular in the reactive dyeing of wool, strong, fast, dyeings. On using dyeing temperatures of 100° to 106° C. the bath exhaustion is found to be high.

With the dyeing obtainable with the compounds according to the invention of the general formula (1) it is possible to dispense with an otherwise customary ammoniacal aftertreatment of the dyed material. Compared with structurally similar known dyes, they surprisingly have a very good color buildup where the brilliant hue is retained in deep shades. They are moveover highly compatible with other fiber-reactive wool dyes which permit a surprisingly level dyeing of the fiber. Similarly, material made of wool fibers of different provenances can be dyed level with the compound according to the invention. To improve the leveling behavior it is possible where appropriate to add a customary leveling auxiliary, such as, for example, N-methyltaurine.

The Examples below serve to illustrate the invention. The parts and percentages are by weight, unless otherwise stated. Parts by weight relate to parts by volume as the kilogram relates to the liter.

The compounds described in terms of formulae in these Examples are shown in the form of the free acids; they are generally prepared and isolated in the form of their sodium or potassium salts and used for dyeing in the form of their salts. The starting compounds and components mentioned in the Examples below, in particular the Tabulated Examples, in the form of the free acid can likewise be used in the synthesis as such or in the form of their salts, preferably alkali metal salts, such as sodium or potassium salts.

EXAMPLE 1

(a) A solution of 18 parts of 1,3-diaminobenzene-4-sulfonic acid in a mixture of 20 parts of water and 18 parts by volume of aqueous 5N sodium hydroxide solution is gradually added with stirring at a pH value between 4 and 5 to a suspension of 18 parts of cyanuric chloride in 60 parts of ice-water; the reaction temperature is maintained at 5° to 10° C. by external cooling. Stirring is continued under these reaction conditions for two hours. Then, while a pH value of 6 is maintained by means of dilute aqueous sodium carbonate solution, a suspension of 42 parts of 1-nitro-2-(4'-aminophenylamino)-5-($\beta$-sulfatoethylsulfonyl)-benzene in 50 parts of water is added, and the reaction temperature is gradually raised to 25° C. On completion of the condensation reaction the resulting solution is acidified with 18 parts of 31% strength aqueous hydrochloric acid and is cooled down to a temperature of 0° to 5° C. by adding ice; the diazotization reaction is carried out in conventional manner with aqueous 1N sodium nitrite solution.

(b) The diazonium salt suspension obtained under (a) is added to a solution of 16 parts of 1-amino-8-hydroxynaphthalene-3,6-disulfonic acid in 200 parts of water; herein the temperature is maintained at 5° to 10° C. by external cooling and the pH is adjusted after completion of the acid coupling to a value between 5 and 6 with dilute aqueous sodium carbonate solution. On completion of the coupling reaction the disazo compound according to the invention is isolated in conventional manner.

This gives a dark blue, electrolyte-containing powder of the sodium salt of the compound of the formula

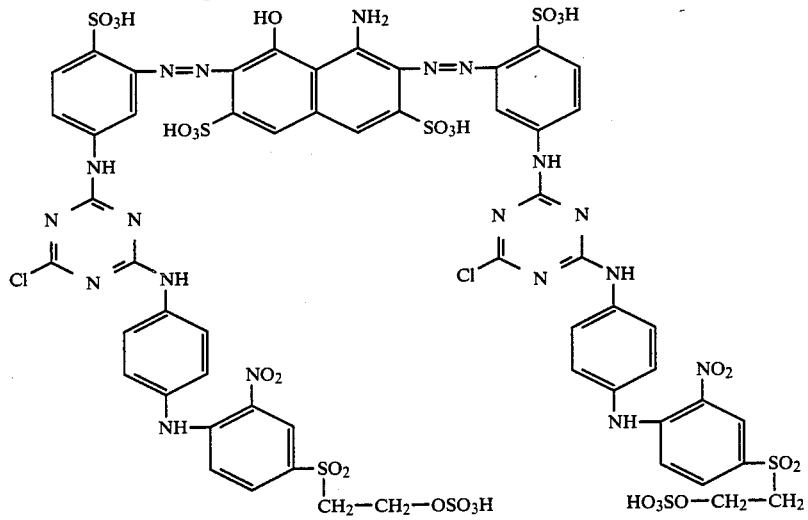

This compound has very good fiber-reactive dye properties and an absorption peak at 605 nm in aqueous solution and produces by the application and fixing methods which are customary in the art for fiber-reactive dyes on the materials mentioned in the description, in particular on cellulose fiber materials, such as cotton, strong greenish blue dyeings having good fastness properties, such as in particular good wet fastness properties.

EXAMPLE 2

A method analogous to that of the procedure of Example (1a) is used to prepare the secondary condensation product of 1,4-diaminobenzene-2-sulfonic acid, cyanuric chloride and 1-nitro-2-(4'-aminophenylamino)-5-(β-sulfatoethylsulfonyl)-benzene, and it is converted into the diazonium salt. The diazonium salt suspension is then coupled in accordance with the directions of Example (1b) with the aqueous solution of 16 parts of 1-amino-3,6-disulfo-8-naphthol in 200 parts of water.

The disazo compound according to the invention which is obtained in the form of the sodium salt and has the formula

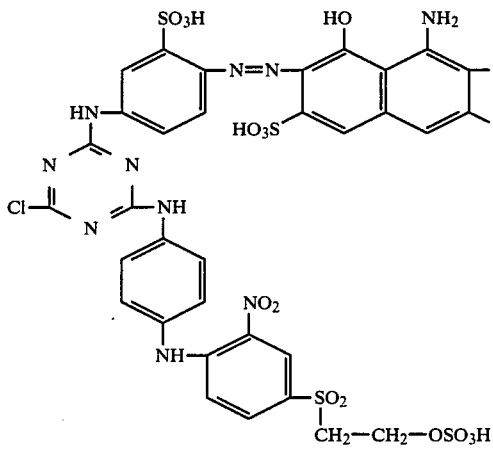

has very good fiber-reactive dye properties and an absorption peak at 629 nm in aqueous solution and produces in particular on cellulose fiber materials, such as cotton, strong blueish green dyeings having good fastness properties, of which in particular the good chlorinated water fastness can be emphasized.

EXAMPLE 3

To prepare a disazo compound according to the invention, the directions of Example 1 are followed, except that 1-nitro-2-(4'-aminophenylamino)-5-(β-sulfatoethylsulfonyl)-benzene is replaced by an equivalent amount of 1-nitro-4-(4'-aminophenylamino)-5-(β-sulfatoethylsulfonyl)-benzene, which is converted analogously to Example 1 into the secondary condensation product of cyanuric chloride and the phenylenediamine and is diazotized. The disazo compound according to the invention which is obtained in the form of the sodium salt likewise has very good fiber-reactive dye properties and an absorption peak of 603 nm in aqueous solution and dyes in particular cotton in strong, fast greenish blue shades.

EXAMPLE 4

To prepare a disazo compound according to the invention, the direction of Example 3 are followed, except that 1,3-diaminobenzene-4-sulfonic acid is replaced by an equivalent amount of 1,4-diaminobenzene-2-sulfonic acid, which is converted analogusly to Example 1 into the secondary condensation product of cyanuric chloride and the phenylene diamine and is diazotized.

The disazo compound according to the invention which is obtained in the form of the sodium salt likewise has very good fiber-reactive dye properties and an absorption peak at 625 nm in aqueous solution and dyes in particular cotton in strong, fast blueish green shades.

EXAMPLES 5 TO 41

The tabulated Examples below describe further disazo compounds according to the invention which conform to a general formula (A)

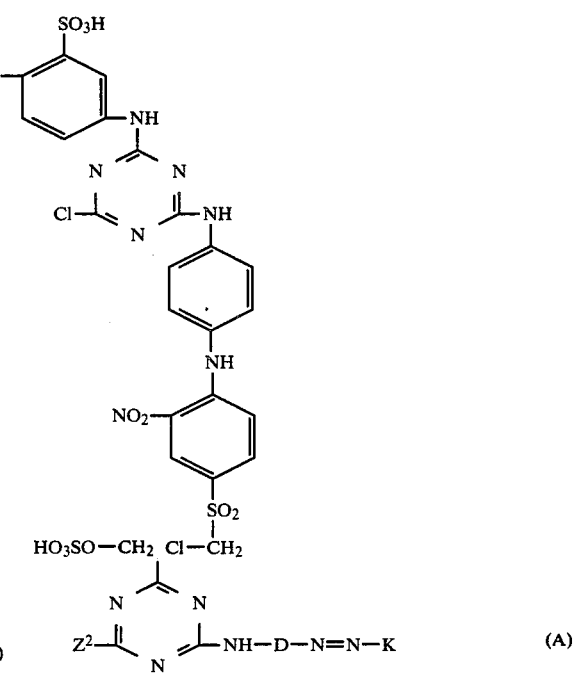

in which D corresponds to the radical of the phenylene diamine of the diazo component, $Z^2$ to the amino radical of the aminonitrodiphenylamine of the general formula (6) mentioned in the description and K to the radical of the coupling component H—K which couples under weakly acid to neutral conditions and which, as a monoazo compound, is prepared beforehand in accordance with the directions of the description by acid coupling of 1-amino-8-naphthol-3,6-disulfonic acid with the diazo component which is recognizable therein; its intermediate isolation before the further coupling reaction with the diazonium salt of the amine of the formula (1b)

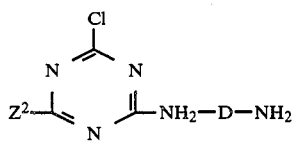

under the weakly acid to neutral coupling conditions mentioned can be dispensed with.

These disazo compounds according to the invention have very good fiber-reactive dye properties and produce on the materials mentioned in the description, such as in particular cellulose fiber materials, by the application methods customary in the industry, preferably by the application and fixing methods customary for fiber-reactive dyes, strong dyeings and prints having good fastness properties, such as for example, the fastness properties indicated in Example 1, in the hue on cotton indicated in the respective tabulated Example.

| | | Disazo compound conforming to the formula (A) | | |
|---|---|---|---|---|
| Example | Aminodiphenylamine H—$Z^2$ | Radical —D— corresponding to diamine $H_2N$—D—$NH_2$ | Coupling component H—K | Hue |
| 5 | 1-Nitro-2-(4'-aminophenyl-amino)-5-(β-sulfatoethyl-sulfonyl)-benzene | 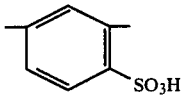 | 1-Amino-2-(4'-sulfophenyl-azo)-8-naphthol-3,6-disul-fonic acid | Blue |
| 6 | 1-Nitro-2-(4'-aminophenyl-amino)-5-(β-sulfatoethyl-sulfonyl)-benzene | " | 1-Amino-2-(1',5'-disulfo-naphthyl-2'-azo)-8-naphthol-3,6-disulfonic acid | Blue |
| 7 | 1-Nitro-2-(4'-aminophenyl-amino)-5-(β-sulfatoethyl-sulfonyl)-benzene | " | 1-Amino-2-(4'-sulfato-ethylsulfonyl-phenylazo)-8-naphthol-3,6-disulfonic acid | Blue |
| 8 | 1-Nitro-2-(4'-aminophenyl-amino)-5-(β-sulfatoethyl-sulfonyl)-benzene | 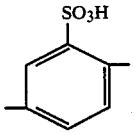 | 1-Amino-2-(4'-sulfophenyl-azo)-8-naphthol-3,6-disul-fonic acid | Blue |
| 9 | 1-Nitro-2-(4'-aminophenyl-amino)-5-(β-sulfatoethyl-sulfonyl)-benzene | " | 1-Amino-2-(1',5'-disulfo-naphthyl-2'-azo)-8-naphthol-3,6-disulfonic acid | Blue |
| 10 | 1-Nitro-2-(4'-aminophenyl-amino)-5-(β-sulfatoethyl-sulfonyl)-benzene | " | 1-Amino-2-(4'-sulfato-ethylsulfonyl-phenylazo)-8-naphthol-3,6-disulfonic acid | Blue |
| 11 | 1-Nitro-2-(4'-aminophenyl-amino)-5-(β-sulfatoethyl-sulfonyl)-benzene | 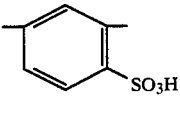 | 1-Amino-2-(3',6',8'-tri-sulfonaphthyl-2'-azo)-8-naphthol-3,6-disulfonic acid | Blue |
| 12 | 1-Nitro-2-(4'-aminophenyl-amino)-5-(βsulfatoethyl-sulfonyl)-benzene | " | 1-Amino-2-(2'-chloro-5'-sulfo-phenylazo)-8-naphthol-3,6-disulfonic acid | Blue |
| 13 | 1-Nitro-2-(4'-aminophenyl-amino)-5-(β-sulfatoethyl-sulfonyl)-benzene | " | 1-Amino-2-(phenylazo)-8-naphthol-3,6-disulfonic acid | Blue |
| 14 | 1-Nitro-2-(4'-aminophenyl-amino)-5-(β-sulfatoethyl-sulfonyl)-benzene | 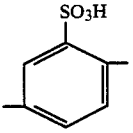 | 1-Amino-2-(3',6',8'-tri-sulfonaphthyl-2'-azo)-8-naphthol-3,6-disulfonic acid | Blue |
| 15 | 1-Nitro-2-(4'-aminophenyl-amino)-5-(β-sulfatoethyl-sulfonyl)-benzene | " | 1-Amino-2-(2'-chloro-5'-sulfo-phenylazo)-8-naphthol-3,6-disulfonic acid | Blue |
| 16 | 1-Nitro-2-(4'-aminophenyl-amino)-5-(β-sulfatoethyl-sulfonyl)-benzene | " | 1-Amino-2-(phenylazo)-8-naphthol-3,6-disulfonic acid | Blue |
| 17 | 1-Nitro-2-(4'-aminophenyl-amino)-5-(β-sulfatoethyl-sulfonyl)-benzene | 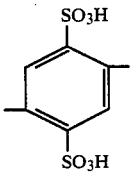 | 1-Amino-2-(4'-sulfo-phenylazo)-8-naphthol-3,6-disulfonic acid | Blue |
| 18 | 1-Nitro-4-(4'-aminophenyl-amino)-5-(β-sulfatoethyl-sulfonyl)-benzene | " | 1-Amino-2-(4'-sulfophenyl-azo)-8-naphthol-3,6-disul-fonic acid | Blue |

-continued

Disazo compound conforming to the formula (A)

| Example | Aminodiphenylamine H—Z² | Radical —D— corresponding to diamine H₂N—D—NH₂ | Coupling component H—K | Hue |
|---|---|---|---|---|
| 19 | 1-Nitro-2-(4'-amino-3'-sulfo-phenylamino)-5-(β-sulfatoethylsulfonyl)-benzene | *para-phenylene with SO₃H* | 1-Amino-2-(4'-sulfophenyl-azo)-8-naphthol-3,6-disulfonic acid | Blue |
| 20 | 1-Nitro-2-(4'-amino-3'-sulfo-phenylamino)-5-(β-sulfatoethylsulfonyl)-benzene | " | 1-Amino-2-(4'-sulfophenyl-azo)-8-naphthol-4,6-disulfonic acid | Blue |
| 21 | 1-Nitro-2-(4'-amino-3'-sulfo-phenylamino)-5-(β-sulfatoethylsulfonyl)-benzene | *ortho-phenylene with SO₃H* | 1-Amino-2-(4'-sulfophenyl-azo)-8-naphthol-3,6-disulfonic acid | Blue |
| 22 | 1-Nitro-2-(4'-aminophenyl-amino)-5-β-sulfatoethyl-sulfonyl)-benzene | *para-phenylene with SO₃H* | 1-Amino-2-(4'-sulfophenyl-azo)-8-naphthol-4,6-disulfonic acid | Blue |
| 23 | 1-Nitro-2-(4'-aminophenyl-amino)-5-β-sulfatoethyl-sulfonyl)-benzene | " | 1-Amino-2-(1',5'-disulfo-naphthyl-2'-azo)-8-naphthol-4,6-disulfonic acid | Blue |
| 24 | 1-Nitro-2-(4'-aminophenyl-amino)-5-β-sulfatoethyl-sulfonyl)-benzene | " | 1-Amino-2-(4'-β-sulfato-ethylsulfonyl-phenylazo)-8-naphthol-4,6-disulfonic acid | Blue |
| 25 | 1-Nitro-2-(4'-aminophenyl-amino)-5-β-sulfatoethyl-sulfonyl)-benzene | *ortho-phenylene with SO₃H* | 1-Amino-2-(4'-β-sulfato-ethylsulfonyl-phenylazo)-8-naphthol-4,6-disulfonic acid | Blue |
| 26 | 1-Nitro-2-(4'-aminophenyl-amino)-5-β-sulfatoethyl-sulfonyl)-benzene | " | 1-Amino-2-(4'-sulfophenyl-azo)-8-naphthol-4,6-disulfonic acid | Blue |
| 27 | 1-Nitro-2-(4'-aminophenyl-amino)-5-β-sulfatoethyl-sulfonyl)-benzene | *para-phenylene with SO₃H* | 1-Amino-2-(2',5'-disulfo-phenylazo)-8-naphthol-3,5-disulfonic acid | Blue |
| 28 | 1-Nitro-2-(4'-aminophenyl-amino)-5-β-sulfatoethyl-sulfonyl)-benzene | *ortho-phenylene with SO₃H* | 1-Amino-2-(2',5'-disulfo-phenylazo)-8-naphthol-3,5-disulfonic acid | Blue |
| 29 | 1-Nitro-2-(4'-aminophenyl-amino)-5-β-sulfatoethyl-sulfonyl)-benzene | " | 1-Amino-2-(2',5'-disulfo-phenylazo)-8-naphthol-4,6-disulfonic acid | Blue |
| 30 | 1-Nitro-2-(4'-aminophenyl-amino)-5-β-sulfatoethyl-sulfonyl)-benzene | *para-phenylene with SO₃H* | 1-Amino-2-(2',5'-disulfo-phenylazo)-8-naphthol-4,6-disulfonic acid | Blue |
| 31 | 1-Nitro-2-(4'-amino-3'-sulfophenylamino)-5-(β-sulfato-ethylsulfonyl)-benzene | " | 1-Amino-2-(2',5'-disulfo-phenylazo)-8-naphthol-3,6-disulfonic acid | Blue |
| 32 | 1-Nitro-2-(4'-amino-3'-sulfophenylamino)-5-(β-sulfato-ethylsulfonyl)-benzene | " | 1-Amino-2-(3'-β-sulfato-ethylsulfonyl-phenylazo)-8-naphthol-3,6-disulfonic acid | Blue |
| 33 | 1-Nitro-2-(4'-amino-3'-sulfophenylamino)-5-(β-sulfato-ethylsulfonyl)-benzene | " | 1-Amino-2-(2'-carboxy-5'-β-sulfatoethylsulfonyl-phenylazo)-8-naphthol-3,6-disulfonic acid | Blue |

-continued

| | | Disazo compound conforming to the formula (A) | | |
|---|---|---|---|---|
| Example | Aminodiphenylamine H—Z² | Radical —D— corresponding to diamine H₂N—D—NH₂ | Coupling component H—K | Hue |
| 34 | 1-Nitro-2-(4'-amino-3'-sulfophenylamino)-5-(β-sulfatoethylsulfonyl)-benzene | " | 1-Amino-2-(2'-chloro-5'-β-sulfatoethylsulfonyl-phenylazo)-8-naphthol-3,6-disulfonic acid | Blue |
| 35 | 1-Nitro-2-(4'-amino-3'-sulfophenylamino)-5-(β-sulfatoethylsulfonyl)-benzene | " | 1-Amino-2-(2'-methoxy-4'-β-sulfatoethylsulfonyl-5'-methyl-phenylazo)-8-naphthol-3,6-disulfonic acid | Blue |
| 36 | 1-Nitro-2-(4'-amino-3'-sulfophenylamino)-5-(β-sulfatoethylsulfonyl)-benzene | " | 1-Amino-2-(2',5'-dimethoxy-4'-β-sulfatoethylsulfonyl-phenylazo)-8-naphthol-3,6-disulfonic acid | Blue |
| 37 | 1-Nitro-2-(4'-amino-3'-sulfophenylamino)-5-(β-sulfatoethylsulfonyl)-benzene | " | 1-Amino-2-(2'-methoxy-5'-β-sulfatoethylsulfonyl-phenylazo)-8-naphthol-3,6-disulfonic acid | Blue |
| 38 | 1-Nitro-2-(4'-amino-3'-sulfophenylamino)-5-(β-sulfatoethylsulfonyl)-benzene | " | 1-Amino-2-(6'-β-sulfatoethylsulfonyl-naphthyl-2'-azo)-8-naphthol-3,6-disulfonic acid | Blue |
| 39 | 1-Nitro-2-(4'-amino-3'-sulfophenylamino)-5-(β-sulfatoethylsulfonyl)-benzene | " | 1-Amino-2-(8'-β-sulfatoethylsulfonyl-naphthyl-2'-azo)-8-naphthol-3,6-disulfonic acid | Blue |
| 40 | 1-Nitro-2-(4'-amino-3'-sulfophenylamino)-5-(β-sulfatoethylsulfonyl)-benzene | " | 1-Amino-2-(2'-bromo-4'-β-sulfatoethylsulfonyl-phenylazo)-8-naphthol-3,6-disulfonic acid | Blue |
| 41 | 1-Nitro-2-(4'-amino-3'-sulfophenylamino)-5-(β-sulfatoethylsulfonyl)-benzene | " | 1-Amino-2-(2'-sulfo-4'-sulfatoethylsulfonyl-phenylazo)-8-naphthol-3,6-disulfonic acid | Blue |

We claim:
1. A water-soluble disazo compound of the formula

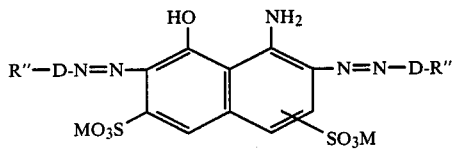

in which

M is hydrogen or an alkali metal or alkaline earth metal;

R" is hydrogen or a group of the formula

in which

Y is vinyl or β-thiosulfatoethyl, β-phosphatoethyl, β-chloroethyl or β-sulfatoethyl, or R" is a group Z, where Z is

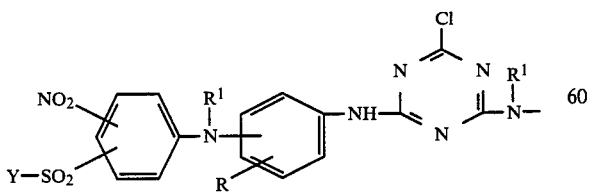

in which

R¹ is hydrogen or is alkyl of 1 to 4 carbon atoms unsubstituted or substituted by one or two substituents selected from the group consisting of acetylamino, hydroxy, sulfato, alkoxy of 1 to 4 carbon atoms, sulfo and carboxy, and the both groups R¹ are identical to or different from each other, R is hydrogen or sulfo and Y is vinyl or β-thiosulfatoethyl, β-phosphatoethyl, β-chloroethyl or β-sulfatoethyl;

and the both groups R" are identical to or different from one another, but at least one of the two R" mandatorily is a group Z, the both groups Y in the groups Y—SO₂— and Z are identical to or different from each other;

D is if R" is hydrogen, a phenyl unsubstituted or substituted by substituents selected from the group of substituents consisting of alkyl of 1 to 4 carbon atoms, alkoxy of 1 to 4 carbon atoms, carboxy, alkanoylamino or 2 to 5 carbon, benzoylamino, sulfobenzoylamino, phenylamino, sulfophenylamino, carbamoyl, carbamoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenylsulfamoyl, N-phenyl-N-(C₁-C₄-alkyl)-sulfamoyl, cyano, nitro, chlorine, bromine, fluorine, trifluoromethyl, hydroxy and sulfo, or D is if R" is hydrogen, a naphthyl unsubstituted or substituted by substituents selected from the group of substituents consisting of sulfo, carboxy, methyl, ethyl, methoxy, ethoxy, alkanoylamino of 2 to 5 carbon atoms, sulfobenzoylamino, benzoylamino, chlorine, hydroxy and nitro, or D is if R" a group Y—SO₂—, a phenylene unsubstituted or substituted by 1 or 2 substituents selected from the group consisting of alkyl of 1 to 4 carbon atoms, alkoxy of 1 to 4 carbon atoms, carboxy, chlorine, bromine, fluorine, trifluoromethyl and sulfo, or is a naphthylene unsubstituted or substituted by 1 or 2 sulfo, or D is if R'' is a group Z, a phenylene unsubstituted or substituted by 1 to 2 substituents selected from the group of substituents consisting of alkyl of 1 to 4 carbon atoms, alkoxy of 1 to 4 carbon atoms, chlorine and sulfo.

2. A compound according to claim 1, wherein one or both groups —D—R'' are groups of the formula —D—Z in which Z is defined as in claim 1 and D is phenylene unsubstituted or substituted by 1 alkyl group of 1 to 4 carbon atoms or 1 alkoxy group of 1 to 4 carbon atoms or by 1 or 2 sulfo.

* * * * *

UNITED STATES PATENT AND TRADEMARK OFFICE
CERTIFICATE OF CORRECTION

PATENT NO. : 4,701,523

DATED : October 20, 1987

INVENTOR(S) : Marcos Segal and Michael Kunze

Page 1 of 2

It is certified that error appears in the above-identified patent and that said Letters Patent is hereby corrected as shown below:

Please amend formula of Example 2 in columns 15 and 16 so that the structural formula reads as follows:

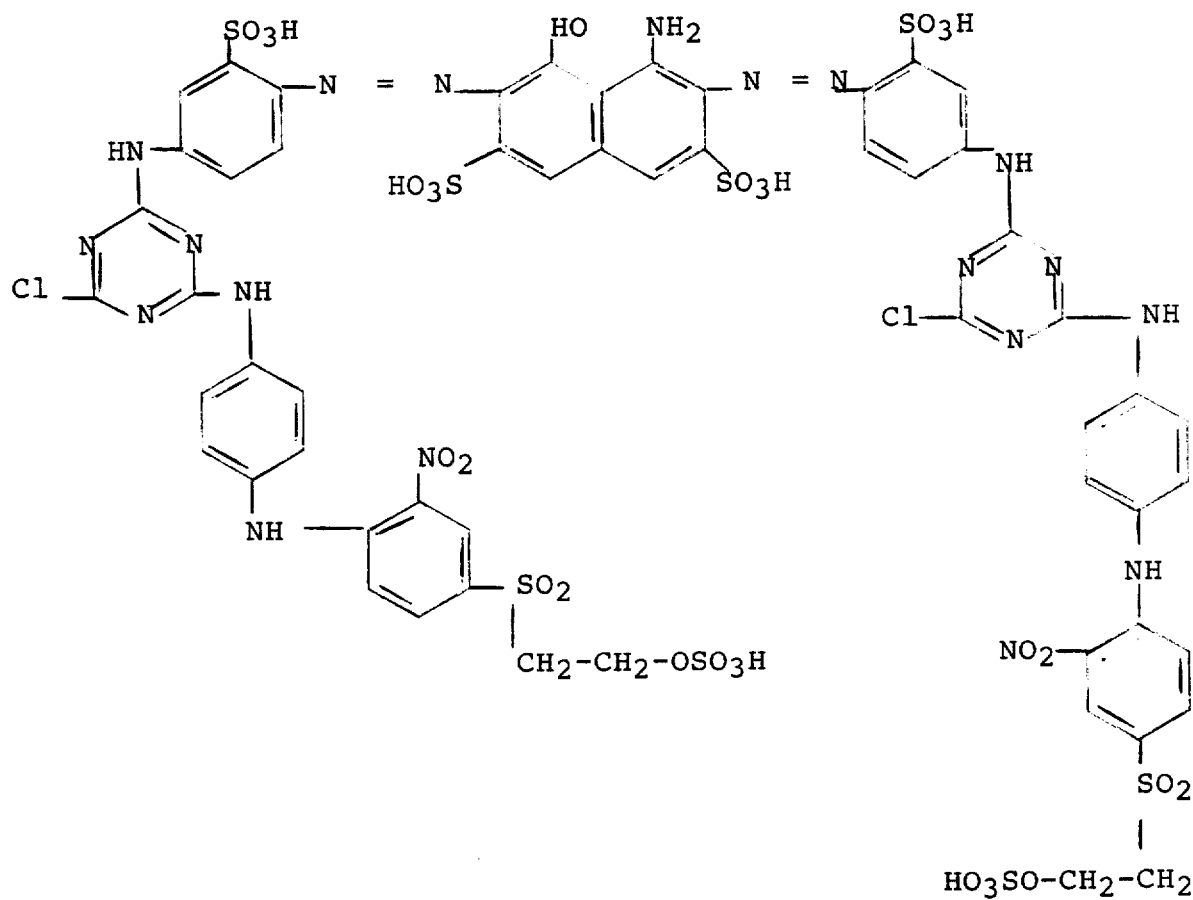

UNITED STATES PATENT AND TRADEMARK OFFICE
CERTIFICATE OF CORRECTION

PATENT NO. : 4,701,523

DATED : October 20, 1987

Page 2 of 2

INVENTOR(S) : Marcos Segal and Michael Kunze

It is certified that error appears in the above-identified patent and that said Letters Patent is hereby corrected as shown below:

Amend formula A in column 16 so that the structural formula reads as follows:

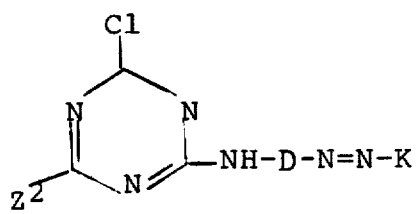

Signed and Sealed this

Third Day of January, 1989

*Attest:*

DONALD J. QUIGG

*Attesting Officer*     Commissioner of Patents and Trademarks